United States Patent
Triglavcanin et al.

(10) Patent No.: US 12,251,649 B2
(45) Date of Patent: Mar. 18, 2025

(54) FEEDWELL APPARATUS, TROUGH, PLANT AND USE

(71) Applicant: Metso Outotec Finland Oy, Tampere (FI)

(72) Inventors: Richard Triglavcanin, Perth (AU); Stephen Viduka, Perth (AU)

(73) Assignee: Metso Outotec Finland Oy, Tampere (FI)

( * ) Notice: Subject to any disclaimer, the term of this patent is extended or adjusted under 35 U.S.C. 154(b) by 428 days.

(21) Appl. No.: 17/764,770

(22) PCT Filed: Sep. 30, 2019

(86) PCT No.: PCT/FI2019/050698
§ 371 (c)(1),
(2) Date: Mar. 29, 2022

(87) PCT Pub. No.: WO2021/064274
PCT Pub. Date: Apr. 8, 2021

(65) Prior Publication Data
US 2022/0355221 A1    Nov. 10, 2022

(51) Int. Cl.
*B01D 21/24* (2006.01)
*B01D 21/01* (2006.01)
*B03D 1/14* (2006.01)

(52) U.S. Cl.
CPC ......... *B01D 21/2427* (2013.01); *B01D 21/01* (2013.01); *B01D 21/2411* (2013.01); *B03D 1/1456* (2013.01)

(58) Field of Classification Search
CPC ................ B01D 21/2427; B01D 21/01; B01D 21/2411; B03D 1/1456
(Continued)

(56) References Cited

U.S. PATENT DOCUMENTS

| 4,431,531 A | 2/1984 | Hollingsworth |
| 2007/0045168 A1* | 3/2007 | Levitt ................ B01D 21/0003 210/405 |
| 2012/0012534 A1 | 1/2012 | Turner |

FOREIGN PATENT DOCUMENTS

| CN | 105854356 A | 8/2016 |
| EP | 2296775 A1 | 3/2011 |

(Continued)

OTHER PUBLICATIONS

International Search Report and Written Opinion for International Application No. PCT/FI2019/050698 mailed Jan. 17, 2020.
(Continued)

*Primary Examiner* — Fred Prince
(74) *Attorney, Agent, or Firm* — Andrus Intellectual Property Law, LLP (57) ABSTRACT

A feedwell apparatus trough, plant and use. The apparatus is adapted to materials including liquids carrying suspended particles, such as slurry containing minerals. The feedwell apparatus includes a supply channel for receiving the material, a trough, a first end of which being connected in fluid communication with the supply channel. The trough has a curved shape that turns in one direction, and a series of through-openings in the wall(s) of the trough. The through-openings are arranged in the trough in unequal pattern such that the area of the through-openings in pro-portion to the corresponding area of the walls has its minimum value in portion of the trough close to the first end thereof, and the relation being arranged to grow with the distance from the first end.

44 Claims, 4 Drawing Sheets

(58) Field of Classification Search
USPC .............................................. 210/801, 512.1
See application file for complete search history.

(56) References Cited

FOREIGN PATENT DOCUMENTS

| | | |
|---|---|---|
| EP | 2716342 A1 | 4/2014 |
| WO | 2008053065 A1 | 5/2008 |
| WO | 2012051536 A1 | 4/2012 |
| WO | 2016149650 A1 | 9/2016 |

OTHER PUBLICATIONS

Office Action and Search Report for Chilean Patent Application No. 202200782, dated Sep. 13, 2023.
Office Action for corresponding Saudi Arabian Patent Application 522432124, dated Aug. 28, 2024.

\* cited by examiner

FEEDWELL APPARATUS, TROUGH, PLANT AND USE

CROSS-REFERENCE TO RELATED APPLICATIONS

This application is the U.S. national stage application of International Application PCT/FI2019/050698, filed Sep. 30, 2019, which international application was published on Apr. 8, 2021, as International Publication WO 2021/064274 A1 in the English language.

BACKGROUND

The invention relates to a feedwell apparatus adapted to materials comprising liquids carrying suspended particles, such as slurry containing minerals.

The invention further relates to a trough of a feedwell apparatus.

The invention further relates to thickener plant, comprising at least one thickener tank.

The invention still further relates to use of the feedwell apparatus.

Thickener/clarifier tanks are used in a wide variety of industries to separate feed slurry, "material", comprising a solids or particulate-containing fluid to produce a "clarified" liquid phase having a lower concentration of solids than the feed slurry and an underflow stream having a higher concentration of solids than the feed slurry.

Many thickener/clarifier tanks are constructed with a feedwell apparatus, usually centrally located within the tank, into which the influent material stream is delivered. The feedwell apparatus generally serves the purpose of reducing the fluid velocity of the incoming influent material stream so that the energy in the stream may be dissipated to some degree before entering the tank.

However, the potential for performance improvement of thickener/clarifier feedwell apparatuses exist.

BRIEF DESCRIPTION

Viewed from a first aspect, there can be provided a feedwell apparatus adapted to materials comprising liquids carrying suspended particles, such as slurry containing minerals, the feedwell apparatus comprising a supply channel for receiving the material, a trough, a first end of which being connected in fluid communication with the supply channel, the trough comprising a curved shape that turns in one direction, and plurality of through-openings in the wall(s) of the trough), wherein the through-openings are arranged in the trough in unequal pattern such that area of the through-openings in proportion to the corresponding area of the walls has its minimum value in portion of the trough close to the first end thereof, and said relation being arranged to grow with the distance from the first end, the feedwell apparatus further comprising a reacting chamber arranged under the trough for receiving the material from the through-openings, and an outlet arranged in the reacting chamber for distributing the material out from the feedwell apparatus.

Thereby an increase in performance of a feedwell apparatus may be achieved by providing at least one of the following advantages: a higher feed energy dissipation, a higher solids hold-up, a more homogeneous mixing of solids/liquor/flocculant, a higher solids exit symmetry, a lower solids exit energy, and lower solids exit shear rate.

Viewed from a further aspect, there can be provided a trough of a feedwell apparatus, the trough comprising a curved shape that turns in one direction, the trough comprising a first end for receiving material comprising liquids carrying suspended particles, such as slurry containing minerals, a second end opposite to the first end, plurality of through-openings in the wall(s) of the trough, wherein the through-openings are arranged in unequal pattern such that area of the through-openings in proportion to the corresponding area of the wall(s) has its minimum value in portion of the trough close to the first end thereof, and said relation being arranged to grow with the distance from the first end.

Thereby a trough providing a higher feed energy dissipation, a higher solids hold-up, a more homogeneous mixing of solids/liquor/flocculant, a higher solids exit symmetry, a lower solids exit energy, and/or a lower solids exit shear rate may be achieved.

Viewed from a further aspect, there can be provided a thickener plant, comprising at least one thickener tank, wherein at least one of said thickener tank(s) is arranged to receive the material from the feedwell apparatus as defined above.

Thereby a plant providing increased unit area throughput and high efficiency may be achieved.

Viewed from a still further aspect, there can be provided use of the feedwell apparatus as defined above for handling tailings from a mineral process of a mining plant, for handling flow from a flotation process of a mining plant, or for handling tailings from a flotation process of a mining plant.

Thereby more efficient processes may be achieved.

The arrangement, the trough, the plant and the use are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, the width of the trough is arranged to decrease from the first end towards a second end of the trough. An advantage is that high initial feed or material speed may be maintained in the trough, and thus an efficient transport of the material through the whole trough is achieved.

In one embodiment, the width of the trough is constant from the first end to a second end of the trough. An advantage is that the capacity of the trough to receive material may be high.

In one embodiment, the cross-section of the trough has an open top. An advantage is that the structure of the trough is simple, and that entrained air in the influent material may escape, and that the slurry stream potentially may be observed.

In one embodiment, the trough has a U-shaped cross-section, with rectangular or rounded corners. An advantage is that the structure of the trough is simple.

In one embodiment, the trough has a V-shaped cross-section. An advantage is that the structure of the trough is simple, and reduces a build-up of settled material which may be required.

In one embodiment, the trough has a tubular cross-section. An advantage is that the structure of the trough isolates the material from surroundings.

In one embodiment, the trough is arranged to make at least a 180° turn in the apparatus. An advantage is that a long trough may be provided without extending the dimensions of the feedwell apparatus, and thus the efficiency of the apparatus may be raised.

In one embodiment, the trough is arranged to make at least a 360° turn in the apparatus. An advantage is that even more efficient feedwell apparatus may be achieved with better material distribution.

In one embodiment, the trough is arranged apart from the outer circumference wall of the reacting chamber. An advantage is that the trough may be construed as an element that is easy to remove from the feedwell apparatus, or to retrofit in a feedwell apparatuses, and that the trough maybe be more centrally located in the reacting chamber optimising material distribution.

In one embodiment, the trough is arranged to constitute a part of the outer circumference wall of the reacting chamber. An advantage is that the structure of the feedwell apparatus may be simplified.

In one embodiment, the turning radius of the trough is decreasing as the distance from the first end thereof is increasing. An advantage is that high initial feed or material speed may be maintained largely throughout the trough.

In one embodiment, the first end and the second end of the trough are arranged on a same horizontal level. An advantage is that the height of the feedwell apparatus may be reduced and thus a more compact apparatus achieved.

In one embodiment, the first end of the trough is arranged higher than the second end. An advantage is that material velocity may be maintained high in the trough.

In one embodiment, the first end of the trough is arranged lower than the second end. An advantage is that material velocity in the trough may be lowered in a controlled way.

In one embodiment, the apparatus comprises more than one trough. An advantage is that the efficiency of the apparatus may be raised, and operation of the apparatus can be maintained in the event one of the multiple feed systems is inoperable.

In one embodiment, the through-openings are arranged in a bottom section of the trough. An advantage is that gravity is exploited in changing horizontal kinetic energy of material into vertical energy.

In one embodiment, the trough comprises through-openings in an innermost wall of said trough. An advantage is that sanding of the through at the innermost wall may be lessened or eliminated, and it improves material distribution within the reacting chamber.

In one embodiment, the trough comprises through-openings in an outermost wall of said trough. An advantage is that sanding of the through at the outermost wall may be lessened or eliminated.

In one embodiment, the through-openings arranged in the bottom section of the trough are arranged in the unequal pattern, and the trough comprises through-openings at least in one of the innermost and outermost wall of said trough, and the through-openings in the innermost wall and/or the outermost wall(s) are arranged in an unequal pattern from the first end to the second end of the trough. An advantage is even massflow distribution inside the feedwell reacting chamber and minimum material build-up from particle settling.

In one embodiment, the through-openings arranged in the bottom section of the trough are arranged in the unequal pattern, and the trough comprises through-openings at least in one of the innermost and outermost wall of said trough, and the through-openings in the innermost wall and/or the outermost wall(s) are arranged in a constant pattern from the first end to the second end of the trough. An advantage is that the manufacturing of the innermost wall and/or the outermost wall(s) may be simplified.

In one embodiment, the through-openings arranged in at least in one of the innermost and outermost wall are arranged in the unequal pattern, and wherein the through-openings in the bottom section of the trough are arranged in a constant pattern from the first end to the second end of the trough. An advantage is that the manufacturing of the bottom section may be simplified.

In one embodiment, the through-openings have a same size, and the change of proportion of the through-openings and the corresponding area of the walls is realized by varying distances between the through-openings. An advantage is that the unequal pattern is easy to manufacture.

In one embodiment, the through-openings vary in their size, and the change of proportion of the through-openings and the corresponding area of the walls is realized by arranging the smallest through-openings near the first end and the largest through-openings near the second end of the trough. An advantage is that the geometry of the unequal pattern may be tailored very precisely and thus an efficient transport of material may be achieved.

In one embodiment, the cross-section of at least some of the through-openings is round. An advantage is that round shapes are easy to manufacture.

In one embodiment, the cross-section of at least some of the through-openings is elongated. An advantage is that the shape of the through-openings may be optimized for changing horizontal kinetic energy of material flow in vertical energy.

In one embodiment, the cross-section of at least some of the through-openings is polygon. An advantage is that the shape of the through-openings may be optimized for changing horizontal kinetic energy of material flow in vertical energy.

In one embodiment, the proportion of the area of the through-openings to the area of the wall is arranged to grow gradually. An advantage is that a trough providing even massflow distribution inside the feedwell reacting chamber and minimum material build-up from particle settling may be achieved.

In one embodiment, the proportion of the area of the through-openings to the area of the wall is arranged to grow step-by-step. An advantage is that the manufacturing step of the through-openings may be simplified.

In one embodiment, the proportion of the area of the through-openings to the area of the wall is selected as follows:

0%-15% in a first quarter of length of the trough,
5%-15% in a second quarter,
5%-20% in a third quarter, and
8%-30% in a fourth quarter of said length.

An advantage is that the efficiency of the feedwell apparatus may be improved.

In one embodiment, the proportion of the area of the through-openings to the area of the wall is selected as follows:

3%-7% in a first quarter of length of the trough,
5%-9% in a second quarter,
7%-11% in a third quarter, and
10%-14% in a fourth quarter of said length.

An advantage is that the efficiency of the feedwell apparatus may further be improved.

In one embodiment, at least some of the through-openings are provided with a nozzle having a length in a direction away from an inside of the trough. An advantage is that it is possible to boost conversion of the initial forward and rotational kinetic energy of the material flow into a vertical downwards directing flow.

In one embodiment, the length of the nozzle is in range of 0.15×D-0.6×D, wherein D is the diameter of the respective through-opening. An advantage is that an effective conversion of the forward and rotational kinetic energy into the vertical downwards directing flow may be achieved.

In one embodiment, the cross-section of the nozzle is round, and the inner diameter of said nozzle is 0.05×W-0.15×W, wherein W is width of a transition box. An advantage is that a better material distribution into the feedwell reacting chamber may be provided, and that the holes are large enough to not block but numerous enough to provide a multitude of material streams.

In one embodiment, the apparatus comprises dilution openings arranged to an outer circumference wall of the reacting chamber for feeding dilution substance into the reacting chamber. An advantage is that the material may be diluted with the dilution substance and the flow of material in the apparatus optimized.

In one embodiment, the dilution openings are arranged all around the outer circumference wall of the reacting chamber. An advantage is that the material may be evenly diluted with the dilution substance.

In one embodiment, the wall of the trough comprises of a polymer lined metallic structure. An advantage is that wear caused by high velocity of material may be reduced.

In one embodiment, the wall of the trough comprises of a polymer composite structure. An advantage is that a light structure of the trough may be achieved.

In one embodiment, the supply channel is arranged to the first end of the trough such that a horizontal alignment angle of the supply channel with relation to said first end is in range of ±20°. An advantage is that an effective transport of material through the trough may be assured.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
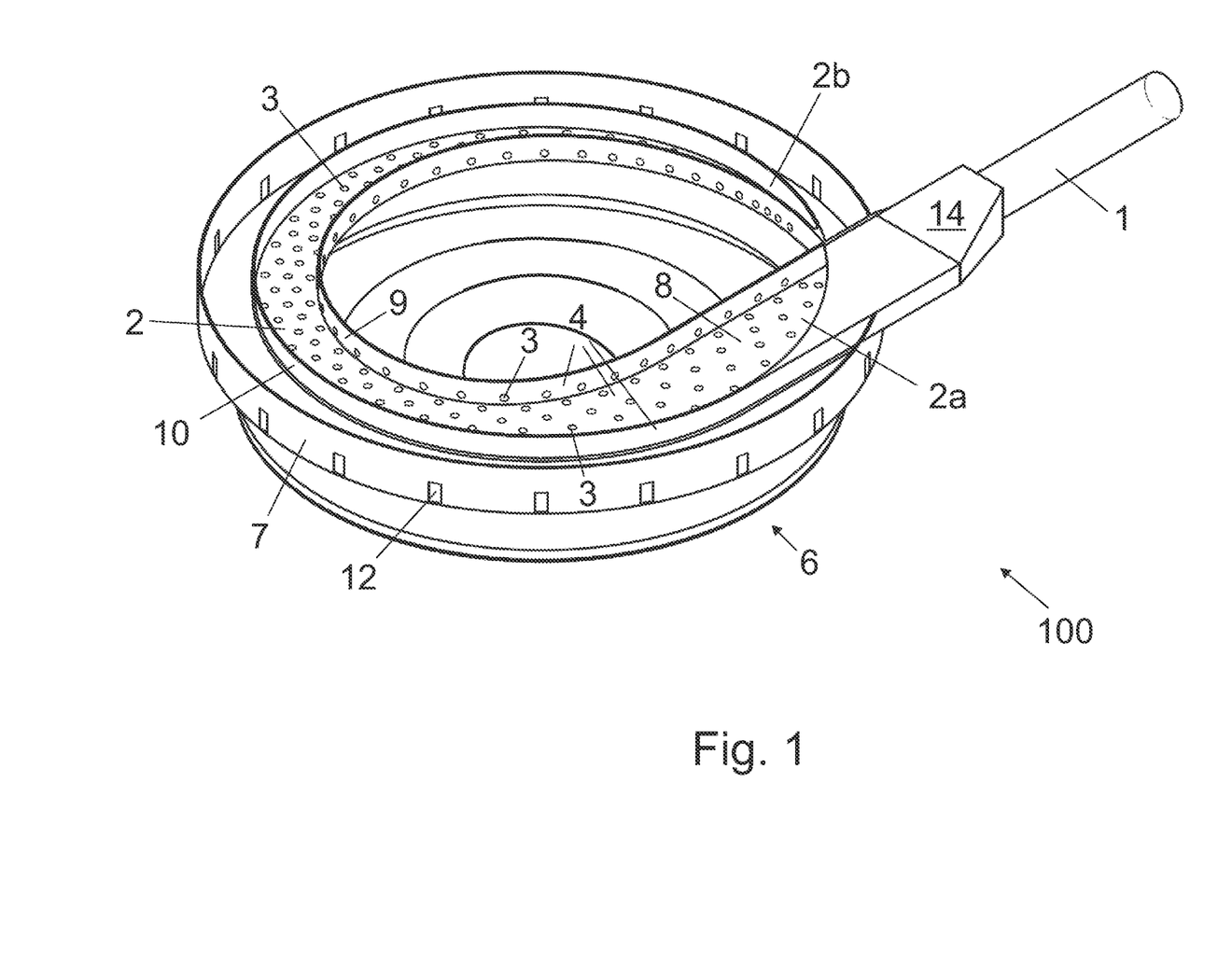
FIG. 1 is a schematic perspective view of a feedwell apparatus.
Figure 2:
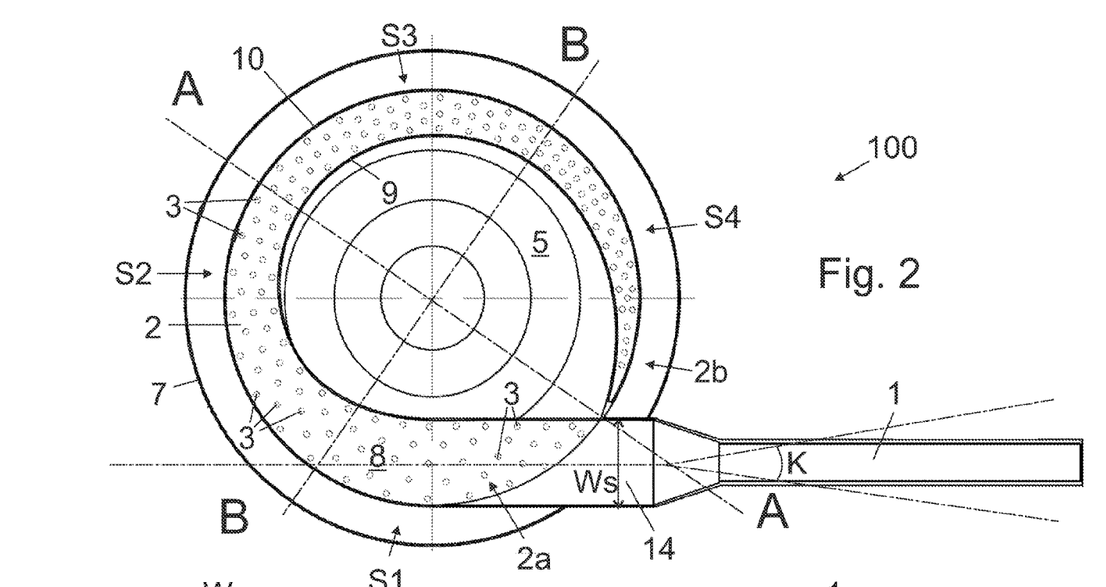
FIG. 2 is a schematic top view of the feedwell apparatus shown in FIG. 1.
Figures 3, 4:
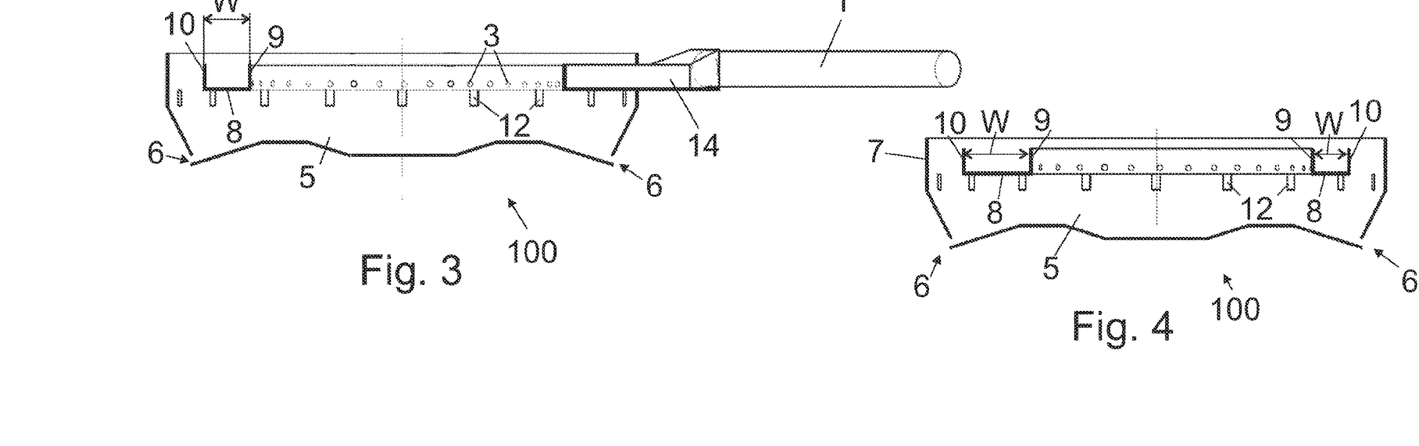
FIG. 3 is a schematic partial cross-section-view along line A-A in FIG. 2.
FIG. 4 is a schematic partial cross-section-view along line B-B in FIG. 2.

FIG. 1 is a schematic perspective view of a feedwell apparatus, FIG. 2 is a schematic top view of the feedwell apparatus shown in FIG. 1, FIG. 3 is a schematic partial cross-section-view along line A-A in FIG. 2, and FIG. 4 is a schematic partial cross-section-view along line B-B in FIG. 2.

Figure 6:
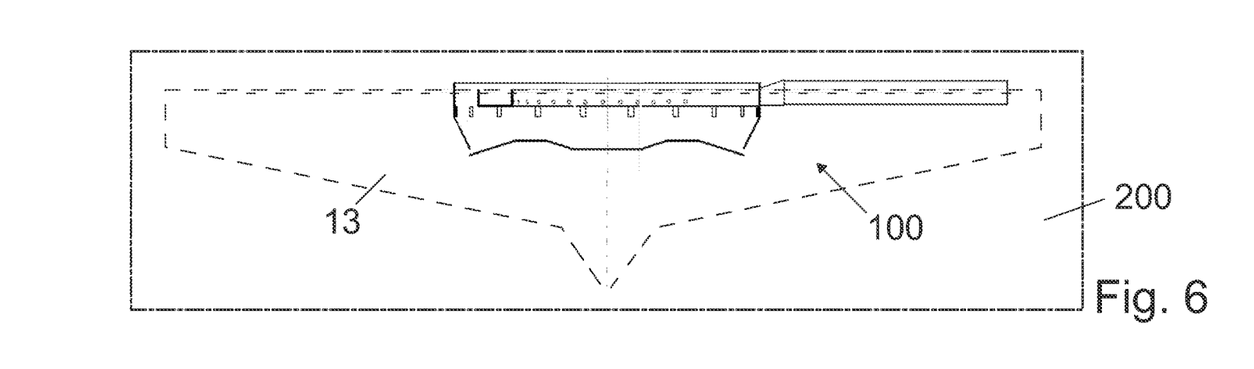
FIG. 6 is a schematic side-view of a feedwell apparatus arranged inside a thickener tank.

The feedwell apparatus 100 is adapted to be used for materials comprising liquids carrying suspended particles, such as slurry containing minerals. Typically, the feedwell apparatus 100 is arranged inside a thickener tank 13, for instance as shown in FIG. 6. The thickener tank 13 is arranged to receive the material from the feedwell apparatus 100.

The feedwell apparatus 100 comprises a supply channel 1 arranged to receive the material to be handled. The supply channel 1 is connected in fluid communication with a first end 2a of a trough 2 by a transition box 14.

The trough 2 has a curved shape that turns in one direction. In an embodiment, the width W of the trough decreases from the first end 2a towards a second end 2b of the trough. However, in another embodiment, the trough 3 has a constant width W from the first end 2a to the second end 2b.

The trough 2 or its wall 4 may be manufactured from various materials, such as metals or alloys. In an embodiment, the trough 2 comprises a metallic structure that is lined or coated by a polymer layer. In another embodiment, the wall 4 of the trough comprises polymer composite structure, that may be lined or coated by a polymer layer.

Figure 9:
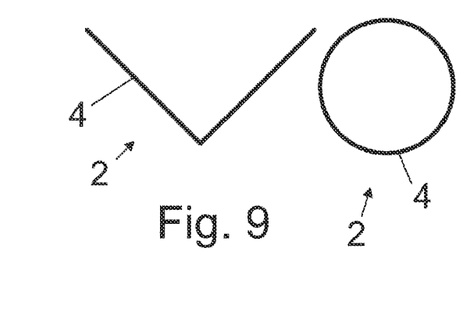
FIG. 9 is schematic top view of cross-sections of some embodiments of the trough.

In an embodiment, the cross-section of the trough 2 has an open top. In the embodiment shown in Figures, the cross-section of the trough 2 is open at the top and has a rectangular U-shape. In another embodiment, corners of the cross-section have a rounded shape. FIG. 9 is showing cross-sections of some embodiments of the trough. In an embodiment, the trough 2 has a V-shaped cross-section. In another embodiment, the trough 2 has a tubular cross-section, for instance a circular cross-section.

According to an aspect, the trough 2 is arranged to make at least a 180° turn in the apparatus 100. In other embodiments, such as shown in Figures, the trough 2 is arranged to make about a 360° turn in the apparatus 100. In some embodiments, the turn may even be more than 360°.

In an embodiment, the trough 2 is arranged apart from the outer circumference wall 7 of the reacting chamber. According to an aspect, the trough 2 as such is a component or structural element (being made up of one or plurality of sub-elements) that can be used as a retrofitting element in thickener plants.

In an embodiment, turning radius of the trough 2 is decreasing as the distance from the first end 2a thereof is increasing. In another embodiment, said radius is increasing as the distance from the first end 2a is increasing. In still another embodiment, said radius is constant all the length of the turning section of the trough 2.

In an embodiment, the first end 2a and the second end 2b of the trough are arranged on a same horizontal level. In another embodiment, the ends are on different level. Thus, the first end 2a may be on a higher or a lower level than the second end 2b.

The trough 2 comprises plurality of through-openings 3 in the walls 4 of the trough 2. The through-openings 3 are arranged in the trough 2 in unequal pattern such that area of the through-openings 3 in proportion to the corresponding area of the walls 4 has its minimum value in portion of the trough 2 close to the first end 2a, and said relation being arranged to grow as the distance from the first end 2a is growing.

In an embodiment, such as in one shown in FIG. 1, the through-openings 3 have a same size and shape (e.g. round), and the change of proportion of the through-openings 3 and the corresponding area of the walls 4 is realized by varying distances between the through-openings 3.

Figure 7:
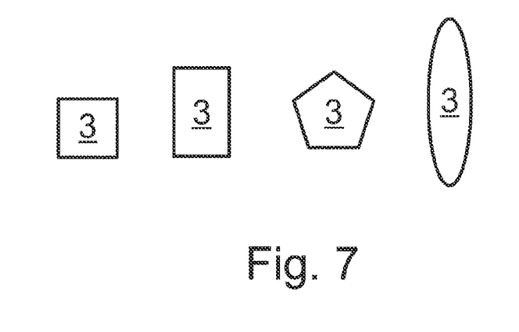
FIG. 7 is schematic top view of some embodiments of the through-opening.

FIG. 7 shows some embodiments of through-openings. The shape or cross-section of the through-openings 3 may be selected rather freely: it may have a shape of closed curve, such as round or ellipse; or polygon, such as square, quadrilateral or pentagon. The shape may be elongated. In an embodiment, all the through-openings 3 have a similar shape. In another embodiment, there are differently shaped through-openings 3 in the trough 2.

In the embodiments shown in Figures, the through-openings 3 are arranged in a bottom section 8 and in an innermost wall 9 of the trough 2. In another embodiment, there are also through-openings 3 in an outermost wall 10 of the trough 2. In some other embodiments, there are through-openings 3 only either in the bottom section 8, in the innermost wall 9 or in the outermost wall 10, or any combinations of the bottom section and the walls.

The through-openings 3 and their unequal pattern may be realized in various ways. In an embodiment, the through-openings 3 are arranged in the bottom section 8 in the unequal pattern, whereas through-openings 3 arranged at least in one of the innermost and outermost wall 9, 10 are arranged in a constant pattern from the first end 2a to the second end 2b of the trough. In another embodiment, the through-openings 2 arranged in the innermost or outermost wall 9, 10, or both, are arranged in the unequal pattern, and the through-openings 3 in the bottom section 8 are arranged in a constant pattern from the first end 2a to the second end 2b of the trough. In still another embodiment, in the wall 4, i.e. the bottom section 8, the innermost wall 9 and the outermost wall 10, all the through-openings 3 are in the unequal pattern.

The proportion of the area of the through-openings 3 to the area of the wall 4 may be arranged to grow gradually or step-by-step.

In an embodiment, the trough is divided lengthwise in four sections S1-S4, and the proportion of the area of the through-openings 3 to the area of the wall 4 is selected as follows:
0%-15% in a first quarter S1 of length of the trough 2,
5%-15% in a second quarter S2,
5%-20% in a third quarter S3, and
8%-30% in a fourth quarter S4 of said length.
In another embodiment, the selection is made as follows:
3%-7% in the first quarter S1,
5%-9% in the second quarter S2,
7%-11% in the third quarter S3, and
10%-14% in the fourth quarter S4 of said length.

The feedwell apparatus 100 comprises further a reacting chamber 5 that is arranged under the trough 2. The reacting chamber 5 receives the material dropping from the through-openings 3. An outlet 6 is arranged in the reacting chamber 5 for distributing the material out from the feedwell apparatus 100. In the shown embodiment, the outlet 6 comprises a gap that circumferences the reacting chamber in a continuous way.

The feedwell apparatus 100 may comprise dilution openings 12 arranged to an outer circumference wall 7 of the reacting chamber for feeding dilution substance in the reacting chamber 5. The dilution substance may be a supernatant dilution liquor which may be mixed with flocculant. In an embodiment, such as shown in Figures, the dilution openings 12 are arranged all around and evenly spaced in the outer circumference wall 7 of the reacting chamber. In other embodiments, the dilution openings 12 are arranged in only some limited section or sections of the outer circumference wall 7, and/or the dilution openings 12 are spaced not evenly in the outer circumference wall 7. All the dilution openings 12 may have a same size, as in Figures, or thy may comprise various sizes.

Figure 8:
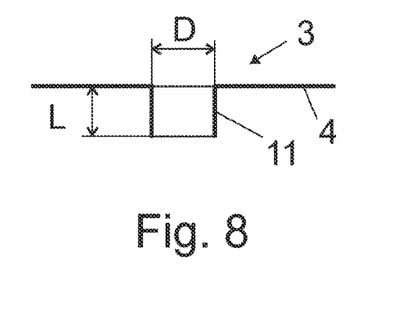
FIG. 8 is a schematic side view of a nozzle in partial cross-section.

In an embodiment, all or at least some of the through-openings 3 are provided with a nozzle 11 that extends from the wall 4 at a first distance D in a direction away from an inside of the trough 2, as shown in FIG. 8. In an embodiment, the length L of the nozzle 11 is selected in range of 0.15×D-0.6×D, wherein D is the diameter of the respective through-opening 3. In another embodiment, the length L of the nozzle 11 is in range of 0.25×D-0.35×D. All the nozzles 11 may have an equal length L, or there may be variations in said lengths.

In an embodiment, the cross-section of the nozzle 11 is round, and the inner diameter D of said nozzle is 0.05×Ws-0.15×Ws, wherein Ws is width of the starting width of the first end of the trough.

In an embodiment, the supply channel 1 is arranged to the first end of the trough 2a such that a horizontal alignment angle K of the supply channel 1 with relation to said first end 2a is in range of ±20°. In the Figures, angle K is 0°.

Figure 5:
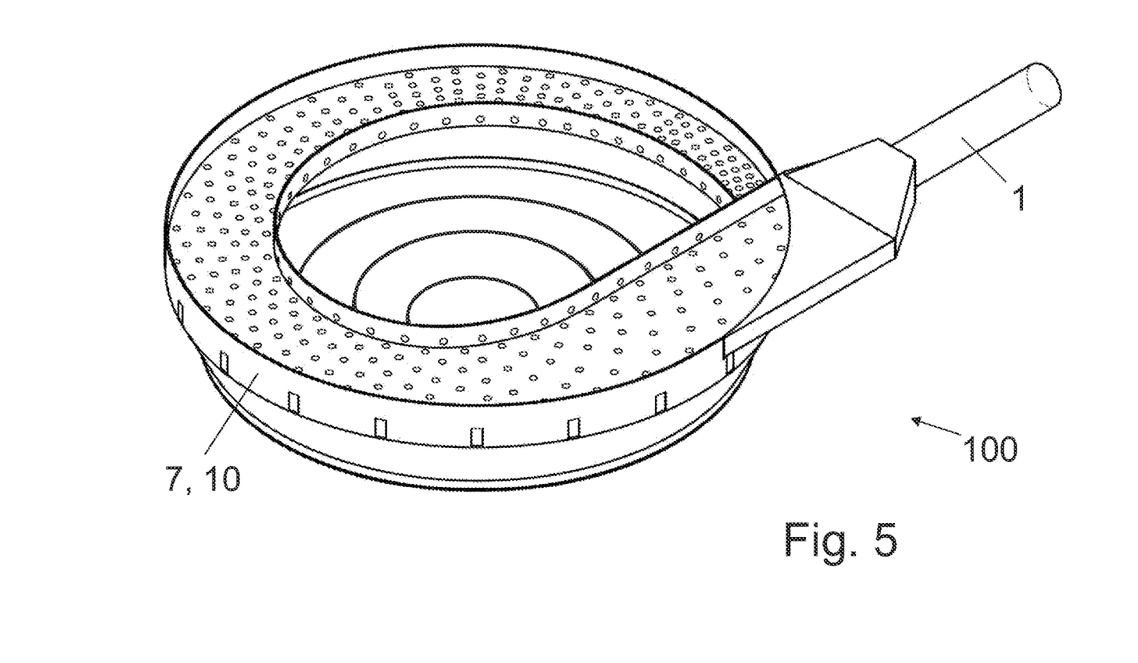
FIG. 5 is a schematic perspective view of another feedwell apparatus.

FIG. 5 is a schematic perspective view of another feedwell apparatus. This embodiment has many features common with the apparatus shown in FIGS. 1-4. However, now the trough 2 is arranged to constitute a part of the outer circumference wall 7 of the reacting chamber.

FIG. 6 is a schematic side-view of a feedwell apparatus 100 arranged inside a thickener tank 13 (shown by dashed lines). The feedwell apparatus 100 and the thickener tank 13 are a part of a thickener plant 200 (shown by dot-and-dash lines). The thickener plant 200 may comprise just one thickener tank 13, or plurality of thickener tanks 13. At least one of the thickener tanks 13, but not necessary all, is arranged to receive the material from the feedwell apparatus 100 described in this description.

According to an aspect, the feedwell apparatus 100 is used for handling tailings from a mineral process of a mining plant.

According to an aspect, the feedwell apparatus 100 is used for handling flow from a flotation process of a mining plant.

According to an aspect, the feedwell apparatus 100 is used for handling tailings from a flotation process of a mining plant.

Figure 10:
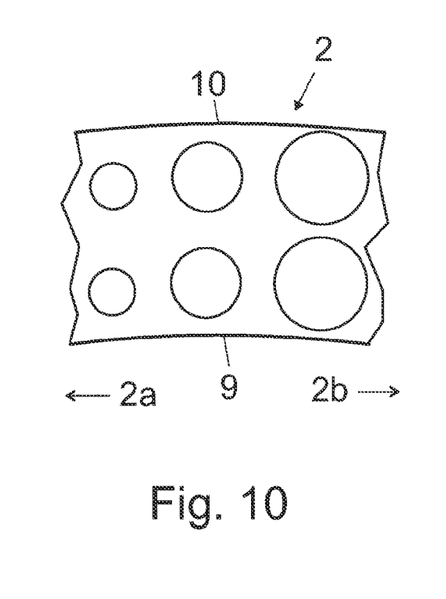
FIG. 10 is a schematic top view of another trough.

FIG. 10 is a schematic top view of another trough. In an embodiment, the change of proportion of the through-openings 3 and the corresponding area of the walls 4 is realized by varying the size of the through-openings 3 such that the smallest through-openings 3 are arranged near the first end 2a and the largest through-openings 3 near the second end 2b of the trough. As shown in FIG. 10, all the through-openings 3 may have a similar shape. In another embodiment, the size of the through-openings 3 is arranged to decrease not only by scaling-down the size of the through-openings but also changing shape thereof. For instance, the largest through-openings 3 may have an elongated shape, such as an elliptical shape, whereas the smallest through-openings 3 are round.

Figure 11:
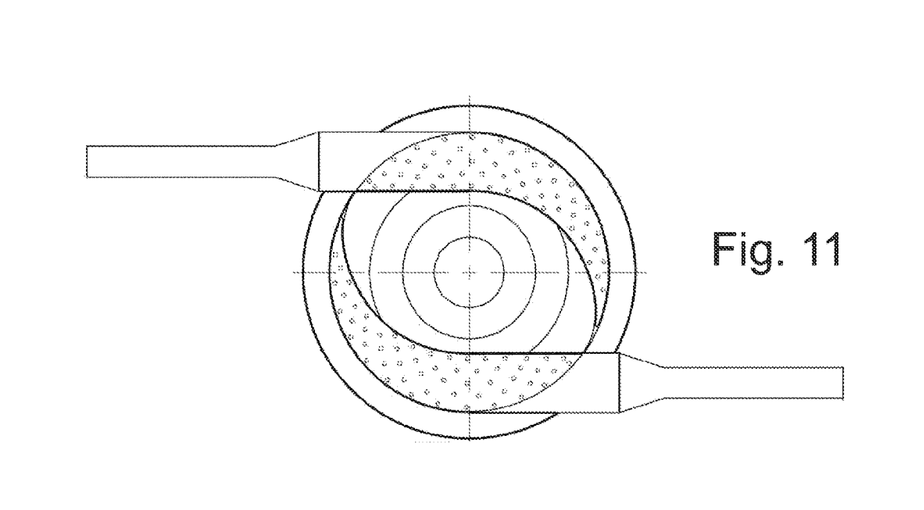
FIG. 11 is a schematic view of still another feedwell apparatus.

FIG. 11 is a schematic view of still another feedwell apparatus. In one embodiment, the apparatus comprises more than one trough 2. FIG. 11 is showing a feedwell apparatus 100 that comprises two troughs. In the shown embodiment, the two troughs 2 are at least essentially identical to each other. In another embodiment, there are some structural variations or differences in the troughs.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 supply channel
2 trough
2a first end of trough
2b second end of trough
3 through-opening
4 wall
5 reacting chamber
6 outlet
7 outer circumference wall
8 bottom section of trough
9 innermost wall of trough
10 outermost wall of trough
11 nozzle
12 dilution opening
13 thickener tank
14 transition box
100 feedwell apparatus
200 thickener plant
D diameter of through-opening
K angle
L length of nozzle
S section of trough
W width of trough
Ws starting width of the trough

The invention claimed is:

1. A feedwell apparatus adapted to materials comprising liquids carrying suspended particles, the feedwell apparatus comprising:
    a supply channel for receiving the materials,
    a trough, a first end of which being connected in fluid communication with the supply channel, the trough comprising a curved shape that turns in one direction, and
    a plurality of through-openings in wall(s) of the trough, wherein
    the through-openings are arranged in the trough in an unequal pattern such that an area of the through-openings in proportion to the corresponding area of the wall(s) has its minimum value in a portion of the trough close to the first end thereof, and
    said proportion being arranged to grow with a distance from the first end,
    the feedwell apparatus further comprising:
    a reacting chamber arranged under the trough for receiving the materials from the through-openings, and
    an outlet arranged in the reacting chamber for distributing the materials out from the feedwell apparatus.

2. The apparatus as claimed in claim 1, wherein a width of the trough is arranged to decrease from the first end towards a second end of the trough.

3. The apparatus as claimed in claim 1, wherein a width of the trough is constant from the first end to a second end of the trough.

4. The apparatus as claimed in claim 1, wherein a cross-section of the trough has an open top.

5. The apparatus as claimed in claim 4, wherein the trough has a U-shaped cross-section, with rectangular or rounded corners.

6. The apparatus as claimed in claim 4, wherein the trough has a V-shaped cross-section.

7. The apparatus as claimed in claim 1, wherein the trough has a tubular cross-section.

8. The apparatus as claimed in claim 1, wherein the trough is arranged to make at least a 180° turn in the apparatus.

9. The apparatus as claimed in claim 1, wherein the trough is arranged to make at least a 360° turn in the apparatus.

10. The apparatus as claimed in claim 1, wherein the trough is arranged apart from an outer circumference wall of the reacting chamber.

11. The apparatus as claimed in claim 1, wherein the trough is arranged to constitute a part of an outer circumference wall of the reacting chamber.

12. The apparatus as claimed in claim 1, wherein a turning radius of the trough is decreasing as a distance from the first end thereof is increasing.

13. The apparatus as claimed in claim 1, wherein the first end and a second end of the trough are arranged on a same horizontal level.

14. The apparatus as claimed in claim 1, wherein the first end of the trough is arranged higher than a second end.

15. The apparatus as claimed in claim 1, wherein the first end of the trough is arranged lower than a second end.

16. The apparatus as claimed in claim 1, comprising more than one trough.

17. The apparatus as claimed in claim 1, wherein the through-openings are arranged in a bottom section of the trough.

18. The apparatus as claimed in claim 1, wherein the trough comprises through-openings in an innermost wall of the trough.

19. The apparatus as claimed in claim 1, wherein the trough comprises through-openings in an outermost wall of the trough.

20. The apparatus as claimed in claim 1, wherein
    the through-openings arranged in the bottom section of the trough are arranged in the unequal pattern, and
    the trough comprises through-openings at least in one of an innermost and an outermost wall of the trough, wherein
    the through-openings in the innermost wall and/or the outermost wall are arranged in a constant pattern from the first end to a second end of the trough.

21. The apparatus as claimed in claim 1, wherein
the through-openings arranged in at least in one of an innermost and an outermost wall are arranged in the unequal pattern, and wherein
the through-openings in a bottom section of the trough are arranged in a constant pattern from the first end to a second end of the trough.

22. The apparatus as claimed in claim 1, wherein
the through-openings arranged in at least in one of an innermost and an outermost wall are arranged in the unequal pattern, and wherein
the through-openings in the bottom section of the trough are arranged in an unequal pattern from the first end to a second end of the trough.

23. The apparatus as claimed in claim 1, wherein
the through-openings have a same size, and wherein
a change of proportion of the through-openings and the corresponding area of the wall(s) is realized by varying distances between the through-openings.

24. The apparatus as claimed in claim 1, wherein
the through-openings vary in their size, and wherein
a change of proportion of the through-openings and the corresponding area of the wall(s) is realized by arranging the smallest through-openings near the first end and the largest through-openings near a second end of the trough.

25. The apparatus as claimed in claim 1, wherein the cross-section of at least some of the through-openings is round.

26. The apparatus as claimed in claim 1, wherein the cross-section of at least some of the through-openings is elongated.

27. The apparatus as claimed in claim 1, wherein the cross-section of at least some of the through-openings is polygon.

28. The apparatus as claimed in claim 1, wherein the proportion of the area of the through-openings to the area of the wall(s) is arranged to grow gradually.

29. The apparatus as claimed in claim 1, wherein the proportion of the area of the through-openings to the area of the wall(s) is arranged to grow step-by-step.

30. The apparatus as claimed in claim 1, wherein the proportion of the area of the through-openings to the area of the wall(s) is selected as follows:
0%-15% in a first quarter of length of the trough,
5%-15% in a second quarter,
5%-20% in a third quarter, and
8%-30% in a fourth quarter of said length.

31. The apparatus as claimed in claim 30, wherein the proportion of the area of the through-openings to the area of the wall(s) is selected as follows:
3%-7% in a first quarter of length of the trough,
5%-9% in a second quarter,
7%-11% in a third quarter, and
10%-14% in a fourth quarter of said length.

32. The apparatus as claimed in claim 1, wherein at least some of the through-openings are provided with a nozzle that extends from the wall(s) at a first distance in a direction away from an inside of the trough.

33. The apparatus as claimed in claim 32, wherein the length of the nozzle is in a range of $0.15 \times D$-$0.6 \times D$, wherein D is a diameter of the respective through-opening.

34. The apparatus as claimed in claim 32, wherein the cross-section of the nozzle is round, and an inner diameter of said nozzle is $0.05 \times Ws$-$0.15 \times Ws$, wherein Ws is a starting width of the nozzle at the first end of the trough.

35. The apparatus as claimed in claim 1, further comprising dilution openings arranged to an outer circumference wall of the reacting chamber for feeding dilution substance in the reacting chamber.

36. The apparatus as claimed in claim 35, wherein the dilution openings are arranged all around an outer circumference wall of the reacting chamber.

37. The apparatus as claimed in claim 1, wherein the wall(s) of the trough comprises a polymer lined metallic structure.

38. The apparatus as claimed in claim 1, wherein the wall(s) of the trough comprises polymer composite structure.

39. The apparatus as claimed in claim 1, wherein the supply channel is arranged to the first end of the trough such that a horizontal alignment angle of the supply channel with relation to the first end is in a range of ±20°.

40. A thickener plant, comprising at least one thickener tank, wherein at least one of the thickener tank(s) is arranged to receive the material from the feedwell apparatus as claimed in claim 1.

41. The feedwell apparatus as claimed in claim 1, wherein the feedwell apparatus is configured for handling tailings from a mineral process of a mining plant.

42. The feedwell apparatus as claimed in claim 1, wherein the feedwell apparatus is configured for handling flow from a flotation process of a mining plant.

43. The feedwell apparatus as claimed in claim 1, wherein the feedwell apparatus is configured for handling tailings from a flotation process of a mining plant.

44. A trough of a feedwell apparatus, the trough comprising a curved shape that turns in one direction, the trough comprising
a first end for receiving material comprising liquids carrying suspended particles,
a second end opposite to the first end,
plurality of through-openings in wall(s) of the trough, wherein
the through-openings are arranged in an unequal pattern such that an area of the through-openings in proportion to a corresponding area of the wall(s) has its minimum value in a portion of the trough close to the first end thereof, and
said proportion being arranged to grow with a distance from the first end.

* * * * *